D. M. KIRKBRIDE.
PLASHED HEDGE.

No. 178,161. Patented May 30, 1876.

WITNESSES
Granville Lewis
M. Church

INVENTOR
David M. Kirkbride
Hill & Ellsworth
By his Attorneys

UNITED STATES PATENT OFFICE.

DAVID M. KIRKBRIDE, OF BLOOMINGTON, ILLINOIS, ASSIGNOR TO WESLEY YOUNG, OF COLUMBUS, OHIO.

IMPROVEMENT IN PLASHED HEDGES.

Specification forming part of Letters Patent No. 178,161, dated May 30, 1876; application filed April 3, 1875.

*To all whom it may concern:*

Be it known that I, DAVID M. KIRKBRIDE, of Bloomington, in the county of McLean and State of Illinois, have invented a new and Improved Plashed Hedge; and I do hereby declare the following to be a full and exact description of the same, reference being had to the accompanying drawings, forming part of this specification, in which—

Figure 1:
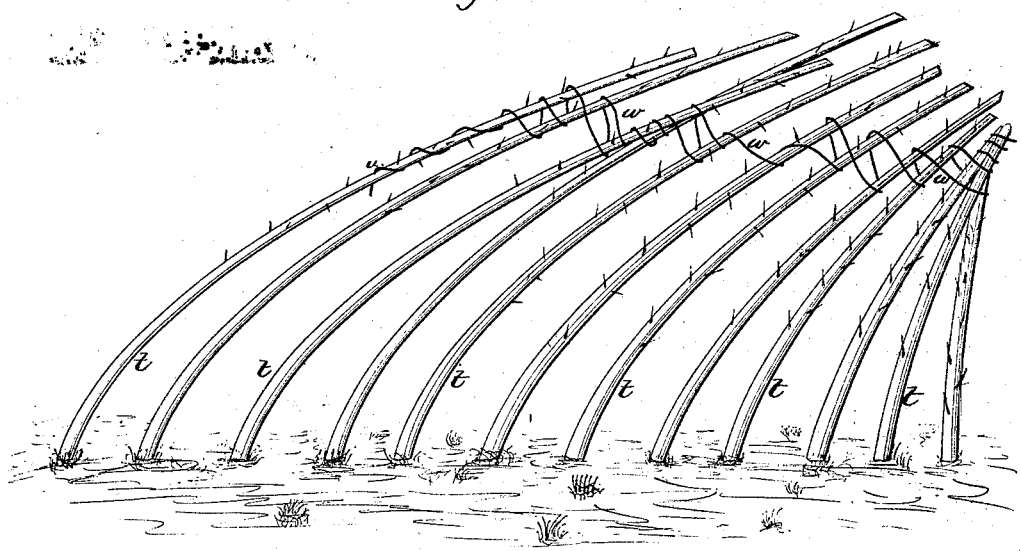
Figure 2:
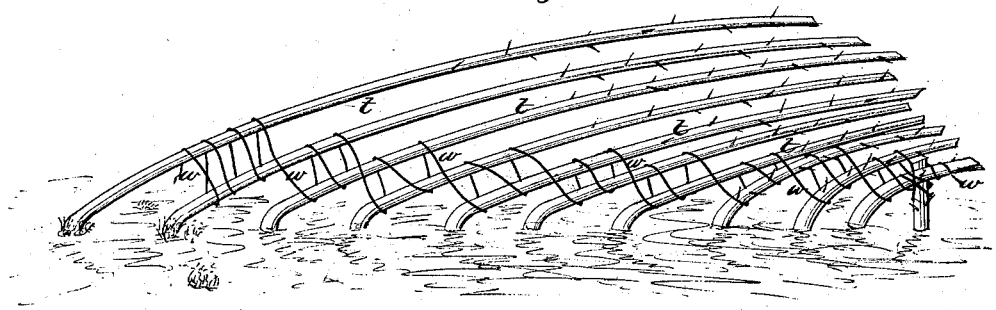
Figure 3:
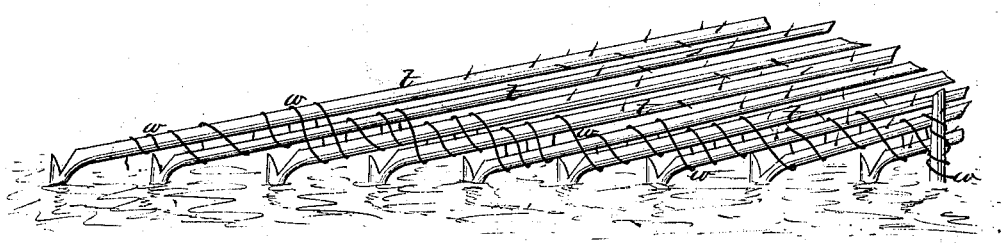

Figures 1, 2, and 3 represent different modifications of my improved hedge.

Similar letters of reference in the accompanying drawings denote the same parts.

In plashing hedges heretofore it has been the uniform practice to interlock the tops or ends of the growing twigs or hedge-canes, with the object of making them support each other against lateral pressure and giving the fence a neat and handsome appearance. This practice, however, has its disadvantages, in that the work is somewhat difficult and the interlocking does not constitute so substantial and durable a fastening as is often required, and is apt to lack uniformity, and thereby diminish the beauty of the hedge.

My invention is intended to obviate these difficulties; to which end it consists in plashing the twigs or canes together by means of wire or other flexible and durable material not a part of the growing hedge, substantially as I will now proceed to describe.

In the drawings, three different forms of hedge are represented, to wit, one in Fig. 1, in which the twigs or canes $t$, having been suitably trimmed, are bent slightly over in line with the plane of the hedge and secured together by a wire, $w$, wound around them, and from one to another, near their upper ends, as shown; one in Fig. 2, in which they are bent down much lower and secured together by a wire near their lower ends; and another in Fig. 3, in which they are cut or broken on one side, lopped down toward the opposite side, and secured together by a wire in the same manner as last above stated. By either method the plashing can be done very rapidly and with perfect uniformity, and the hedge will, from the outset, form a substantial and durable fence.

I am aware that hedges have been formed of willow stakes, driven in a position somewhat inclined, with the tops bound together by the interweaving of some binding material not a part of the fence, and that the stakes, after being driven, often grow and form a living hedge. I wish, therefore, to be understood as not claiming, broadly, any such inclined fence.

My invention pertains to the ordinary hedge used on uplands, and the canes are so bent and held that they throw out offshoots, which grow up across and among the canes which are above that from which they spring.

I am also aware that hedges such as those to which my invention pertains have been formed by bending down the tops in line with the fence, or approximately so, and holding the bent canes by weights placed thereon. In such cases no additional strength is gained, and the weights are liable to be displaced.

My wire connections serve the double purpose of holding down the canes and strengthening the fence, the latter being a very important element.

I claim as my invention—

A plashed hedge, consisting of growing twigs or canes $t$, bent over in line with the plane of the fence and secured together by means of a line or lines of wire, $w$, or other flexible fastenings not a part of the growing hedge, substantially as described.

DAVID M. KIRKBRIDE.

Witnesses:
W. WEYAND,
H. R. BENSON.